US012589307B2

(12) United States Patent
Benedetto et al.

(10) Patent No.: US 12,589,307 B2
(45) Date of Patent: Mar. 31, 2026

(54) AVATAR GENERATION USING AN IMAGE OF A PERSON WITH MODIFIER DESCRIPTION

(71) Applicant: Sony Interactive Entertainment Inc., Tokyo (JP)

(72) Inventors: Warren Benedetto, Foothill Ranch, CA (US); Arran Green, San Diego, CA (US); Rebecca Abel, Longmont, CO (US); Jon Webb, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 280 days.

(21) Appl. No.: 18/095,387

(22) Filed: Jan. 10, 2023

(65) Prior Publication Data

US 2024/0226750 A1 Jul. 11, 2024

(51) Int. Cl.
| A63F 13/65 | (2014.01) |
| A63F 13/213 | (2014.01) |
| A63F 13/42 | (2014.01) |
| G06T 13/40 | (2011.01) |

(52) U.S. Cl.
CPC ............ A63F 13/65 (2014.09); A63F 13/213 (2014.09); A63F 13/42 (2014.09); G06T 13/40 (2013.01)

(58) Field of Classification Search
CPC ......... A63F 13/65; A63F 13/213; A63F 13/42
See application file for complete search history.

(56) References Cited

U.S. PATENT DOCUMENTS

| 2004/0152512 A1* | 8/2004 | Collodi ................... A63F 13/10 |
| | | 463/30 |
| 2019/0172243 A1* | 6/2019 | Mishra .................. G10L 15/005 |
| 2022/0068037 A1* | 3/2022 | Pardeshi ................ G06N 3/045 |
(Continued)

FOREIGN PATENT DOCUMENTS

| CN | 111524207 A | 8/2020 |
| CN | 114120412 A | 3/2022 |
| CN | 114638919 A | 6/2022 |

OTHER PUBLICATIONS

PCT/US2023/0885439 Notification of Transmittal of the International Search Report and the Written Opinion of the International Searching Authority, or the Declaration, PCT/ISA/220, and the International Search Report, PCT/ISA/210, Apr. 25, 2024.

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT
A method for generating an avatar for a video game is provided, including: receiving, over a network from a client device, a captured image of a user and modification data, the modification data being generated from user input received at the client device, the modification data describing characteristics for generating an avatar for the user; using an image generation artificial intelligence (AI) to generate the avatar based on the image of the user and the modification data; wherein the avatar is configured for use in a video game, and wherein the image generation AI is configured to generate the avatar having a style consistent with a style of the video game in which the avatar will be used; applying the avatar to a session of the video game.

18 Claims, 8 Drawing Sheets

(56)        References Cited

U.S. PATENT DOCUMENTS

| 2023/0130535 | A1 * | 4/2023 | Ma | ........................... | G06T 13/40 |
| | | | | | 345/474 |
| 2023/0351643 | A1 * | 11/2023 | Tanaka | ................. | G06V 10/764 |
| 2024/0013463 | A1 * | 1/2024 | Assouline | ............. | G06T 19/006 |

* cited by examiner

Receive captured image of user — 500

Receive modification data describing characteristics
for generating an avatar — 502

Use an image generation AI to generate avatar
consistent with a video game style — 504

Apply the avatar to a session of the
video game — 506

AVATAR GENERATION USING AN IMAGE OF A PERSON WITH MODIFIER DESCRIPTION

1. FIELD OF THE DISCLOSURE

The present disclosure relates generally to methods, systems and devices for avatar generation using an image of a person with modifier description.

BACKGROUND

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

It is in this context that implementations of the disclosure arise.

SUMMARY

Implementations of the present disclosure include methods, systems and devices for avatar generation using an image of a person with modifier description.

In some implementations, a method for generating an avatar for a video game is provided, including: receiving, over a network from a client device, a captured image of a user and modification data, the modification data being generated from user input received at the client device, the modification data describing characteristics for generating an avatar for the user; using an image generation artificial intelligence (AI) to generate the avatar based on the image of the user and the modification data; wherein the avatar is configured for use in a video game, and wherein the image generation AI is configured to generate the avatar having a style consistent with a style of the video game in which the avatar will be used; applying the avatar to a session of the video game.

In some implementations, the modification data is defined by text data.

In some implementations, the modification data identifies one or more ways in which an appearance of the user in the captured image is to be modified by the image generation AI.

In some implementations, the image is captured by a camera connected to, or included in, the client device.

In some implementations, applying the avatar to the session of the video game includes rendering the avatar in a virtual environment generated by execution of the session of the video game.

In some implementations, the avatar defines a three-dimensional object in the video game.

In some implementations, the modification data is processed to include one or more additional features before being used by the image generation AI to generate the avatar.

In some implementations, the one or more additional features include features determined from a gaming history of the user.

In some implementations, the session of the video game is executed by the client device.

In some implementations, the avatar is stored in association with a user account of the user on a gaming platform.

In some implementations, a non-transitory computer-readable medium having program instructions embodied thereon is provided, said program instructions being configured, when executed by at least one server computer, to cause said at least one server computer to perform a method for generating an avatar for a video game, said method including the following operations: receiving, over a network from a client device, a captured image of a user and modification data, the modification data being generated from user input received at the client device, the modification data describing characteristics for generating an avatar for the user; using an image generation artificial intelligence (AI) to generate the avatar based on the image of the user and the modification data; wherein the avatar is configured for use in a video game, and wherein the image generation AI is configured to generate the avatar having a style consistent with a style of the video game in which the avatar will be used; applying the avatar to a session of the video game.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems and devices for avatar generation using an image of a person with modifier description.

In some implementations, users are able to upload a photo of themselves, coupled with a text description of how the image should be modified to create an avatar. For example, in addition to the photo of the person, a description can be specific as to how features of the person should be modified. The modification can include, make me stronger, make me taller, make me thinner, etc. Additionally, input can be provided to drive the image generation model to make changes to the output based on a style derived from a specific game scene. This can include modifying a character to be consistent with the target game scene or scenes of the game. If an avatar is modified for a racing game, the modifications of the avatar can be consistent with clothing or things worn by a racer in a scene similar to the racing game. Generally, this also includes using artist curated images. The artist curated images are used as training data by an image generation model or service. The image input can be correlated with natural language directed input that describes what the output image should contain, in addition to the image input queries.

With the above overview in mind, the following provides several example figures to facilitate understanding of the example embodiments.

Figure 1:
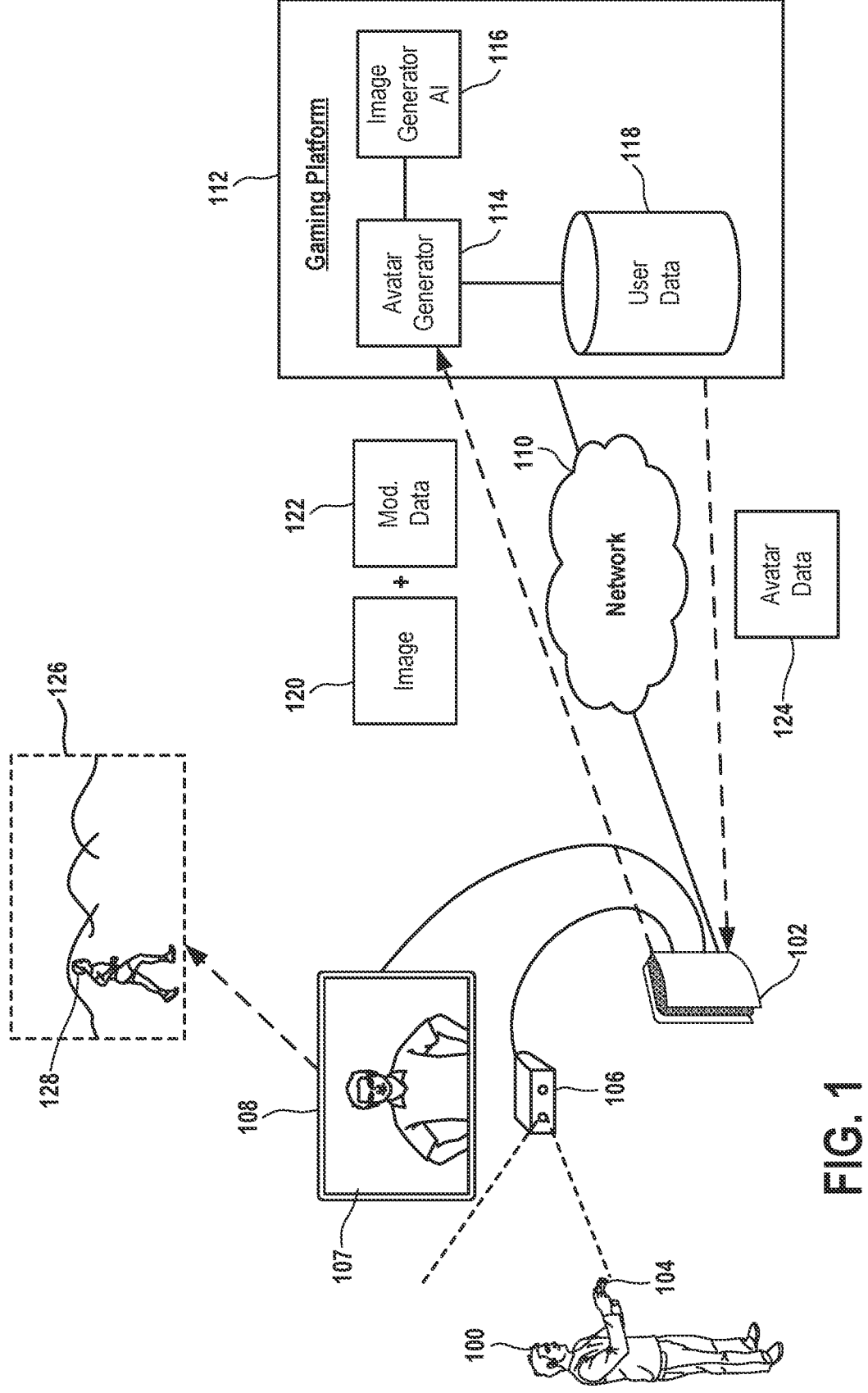
FIG. 1 conceptually illustrates a system for enabling a user to generate an avatar for use in a video game, in accordance with implementations of the disclosure.

FIG. 1 conceptually illustrates a system for enabling a user to generate an avatar for use in a video game, in accordance with implementations of the disclosure.

Broadly speaking, the systems and methods of the present disclosure provide for the generation of avatars for use in the context of video games, including use as profile avatars, as well as for use in-game for gameplay of the video game. In the illustrative implementation, to facilitate the avatar generation process, a user 100 interacts with a user interface 107 for avatar generation presented by a computing device 102 on a display 108. In some implementations, the computing device 102 is also capable of executing or otherwise facilitating gameplay of a video game. In some implementations, the computing device 102 is specifically a gaming console, such as the PlayStation® 5 gaming console provided by Sony Interactive Entertainment LLC. In other implementations, the computing device 102 can be a personal computer, laptop, tablet, cellular phone, mobile device, or any other device capable of rendering the user interface 107 for facilitating avatar generation as described herein.

The user 100 operates an input device 104 to interact with the user interface 107. In various implementations, the input device can include one or more of a game controller, keyboard, mouse, touchpad, touch screen, joystick, motion controller, or any of various input devices facilitating user input for avatar generation or gameplay. Broadly speaking, via the user interface 107, the user 100 is able to upload an image 120 of themselves to an avatar generator 114, and the image 120 will be used to generate an avatar. In some implementations, a camera 106 is operatively connected to the computing device 102, and used to capture the image 120 of the user 100 for uploading. For example, in some implementations, a live feed from the camera 106 is presented through the user interface 107, and the user 100 is able to trigger image capture through the input device 104, such as by pressing a button or otherwise activating an input mechanism.

The image 120 of the user 100 is uploaded by computing device 102 over a network 110 to the avatar generator 114. It will be appreciated that network 110 can include any of various data networks including wireless/wired networks, local/wide area networks, and the Internet. In some implementations, the image 120 is in the form of an image data file having an image file format such as a JPEG, Tiff, PNG, BMP, etc. In addition to the image 120, modification data 122 can be submitted. The modification data 122 provides descriptive information about how the user 100 wants their avatar to appear and/or how they want their self image to be modified during generation of the avatar. In some implementations, the modification data 122 includes text that is inputted by the user 100 through the user interface 107. In further implementations, the modification data 122 may include recorded audio of the user 100 speaking their desired avatar appearance and modifications.

The avatar generator 114 receives the image 120 and modification data 122 over the network 110 from the computing device 102, and uses the image 120 and the modification data 122 to generate an avatar for the user 100 for use in the context of a video game. To generate the avatar, the avatar generator 114 accesses an image generation artificial intelligence (AI) 116. In some implementations, the image 120 and the modification data 122 are passed as input to the image generation AI 116 in order to generate the avatar. In some implementations, the image 120 or the modification data 122 are processed or adjusted prior to being submitted as input to the image generation AI 116, so as to achieve a result that is more likely to be desirable for the user 100.

In some implementations, the image generation AI 116 is configured to generate a two-dimensional avatar image. It will be appreciated that such a two-dimensional avatar can be used as a profile image, and may also be used for gameplay in video games in which gameplay occurs in a two-dimensional virtual environment. In some implementations, such a two-dimensional avatar is further processed to create a three-dimensional avatar. For example, the two-dimensional avatar can be converted to a three-dimensional model, which can be used for the user's profile and also used as an avatar in gameplay of a video game occurring in a three-dimensional virtual environment.

In other implementations, the image generation AI 116 is configured to generate a three-dimensional avatar directly based on the image 120 of the user 100. In some implementations, the image 120 of the user 100 is a two-dimensional image, whereas in other implementations the image 120 is a three-dimensional image. For example, the camera 106 may include a depth camera that captures depth information, and therefore the captured image of the user 100 may include depth information identifying the depth of pixels in the image.

In still other implementations, the image 120 is a video of the user 100 (e.g. captured by the camera 106), for example, perhaps showing the user in various positions, poses, expressions, performing movements, actions, etc. In some implementations, images are extracted from the video by the avatar generator 114, and such images are used by the image generation AI 116 to generate and avatar. In other implementations, the video itself is used by the image generation AI 116 to generate an avatar. In some implementations, movements/actions of the user 100 are analyzed from the video and applied to the avatar to inform how the avatar will move or perform actions in-game. For example, the movements of the user can be analyzed to identify skeletal points for 3D modeling, and characteristics of the user's movements can be used to determine similar characteristics of movement for the avatar (e.g. range and angles of movements, acceleration/deceleration/velocity of movements, etc.).

The generated avatar can be stored to a user data storage 118, and retrieved or downloaded as needed for use in or with a video game. In some implementations, the user's avatar is stored in association with the user's profile or account on the gaming platform. For example, avatar data 124 can be downloaded over the network 110 to the computing device 102 to be used in a video game executed by the computing device 102 to render gameplay video for presentation on the display 108. In the illustrated implementation, the avatar data 124 is used in the execution of the video game to render the user's avatar 128 in a scene 126 of the video game presented on the display 108. In cloud gaming implementations, the video game is executed on a cloud resource, and gameplay video is streamed over the network to the computing device 102 for presentation on the display 108. In additional implementations, the avatar is used as a profile avatar or image for the user, visible to others that may be interacting with the gaming platform, such as through social or communications applications/features of the platform, etc. In some implementations the avatar is made accessible through applications outside of the gaming platform, such as through an exposed API of the gaming platform.

In some implementations, the avatar generator 114, the image generation AI 116, and the user data storage 118, are part of a gaming platform 112. By way of example without limitation, the gaming platform 112 may provide various services related to video games, such as personal profiles, access to game titles for purchase and download, storage of game-related activity or information (e.g. trophies, achievements, virtual currency, gaming statistics, etc.), social and communications tools for communication and sharing between users, game streaming and spectating, etc. In some implementations, the gaming platform 112 also provides cloud gaming services. One example of a gaming platform is the PlayStation® Network provided by Sony Interactive Entertainment LLC.

In some implementations, the user interface 107 is defined by a website or web interface rendered in a browser application executed by the computing device 102. For example, the gaming platform 112 or the avatar generator 114 may provide a website or web interface through which the user 100 may upload the image 120 and provide the modification data 122 to generate the avatar. In some implementations, the avatar generator 114 exposes an Application Programming Interface (API) that is accessible over the network 110 to enable the uploading and avatar generation process.

Figure 2:
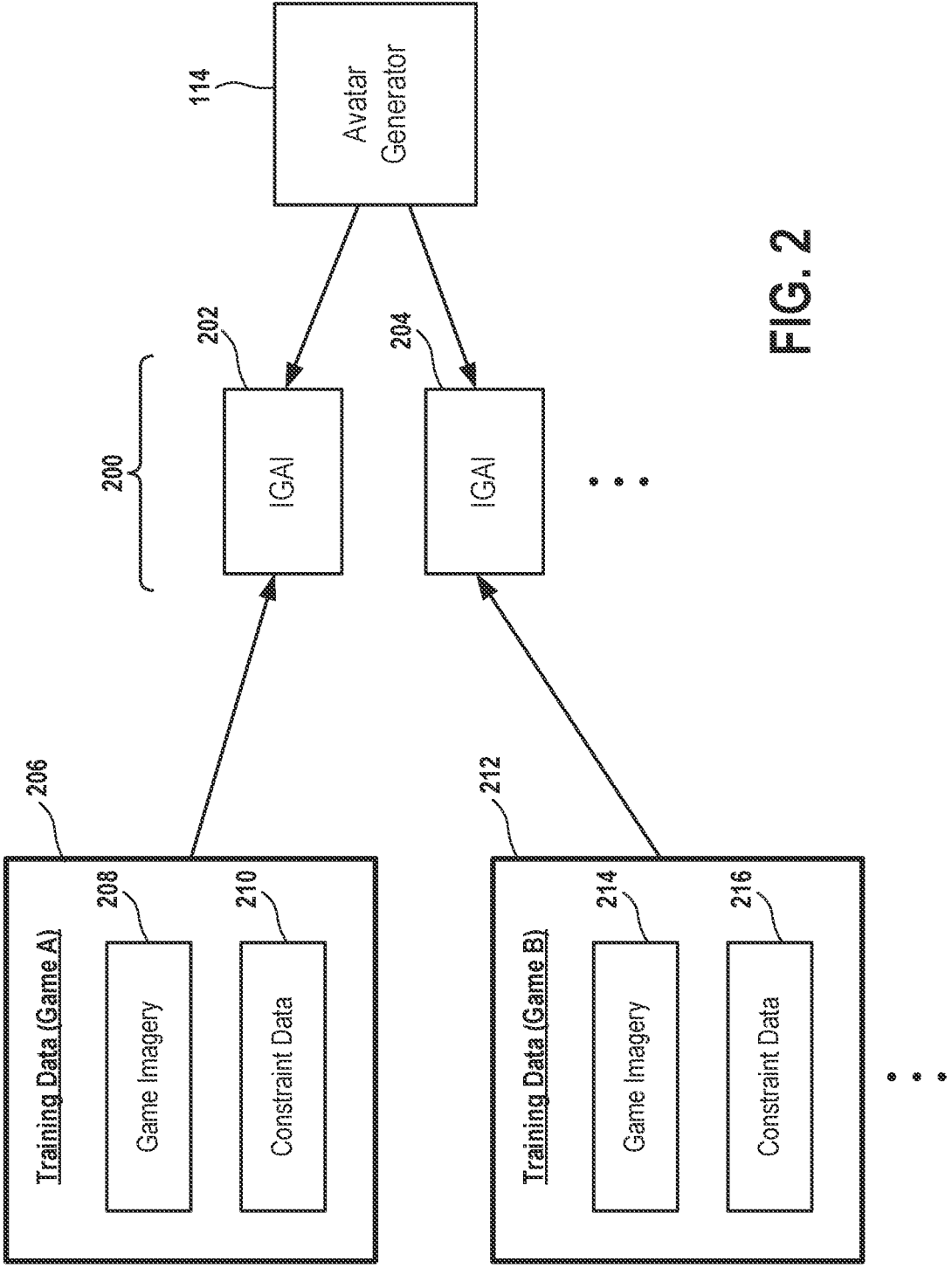
FIG. 2 conceptually illustrates multiple image generation AI's trained for generating avatars for different video game contexts, in accordance with implementations of the disclosure.

FIG. 2 conceptually illustrates multiple image generation AI's trained for generating avatars for different video game contexts, in accordance with implementations of the disclosure.

It will be appreciated that different video games will have different contexts, including various art styles, themes, characters, elements, settings, etc. Thus, an avatar that is designed to fit within the context of one video game, may not be appropriate for another video game. Accordingly, in some implementations, a library 200 of various image generation AI's is provided, with different image generation AI's being configured to generate avatars for a specific video game context. For example, in the illustrated implementation, the library 200 includes an image generation AI 202 that is configured to generate avatars for a given game "A," and the library 200 further includes an image generation AI 204 that is configured to generate avatars for a given game "B."

It will be appreciated that the avatar generator 114 can be configured to select one of the image generation AI's from the library 200 so as to generate an avatar that is appropriate for a desired video game context. In some implementations, the desired video game context can be selected by the user through the above-described user interface. In some implementations, avatar generation is accessed during interactions with a given video game itself, such as by accessing a specific menu or feature item for avatar generation while the user is interacting with the video game. Information indicating which video game is desired or being played is transmitted to the avatar generator and accordingly, the avatar generator can select the relevant image generation AI for that video game, so as to generate an avatar that fits within the context of the video game.

In some implementations, different image generation AI's are trained for different video game contexts using different sets of training data that are specific to each video game. For example, in the illustrated implementation, training data 206 is used to train the image generation AI 202 to generate avatars suitable for the video game "A"; and, training data 212 is used to train the image generation AI 204 to generate avatars suitable for the video game "B." In some implementations, the training data 206 includes game imagery 208 and constraint data 210; and, the training data 212 includes game imagery 214 and constraint data 216. In some implementations, the game imagery 208 includes images, video, 2D/3D modeling information, texture information, and other information indicating or defining how avatars or other objects appear in the video game "A." The image generation AI 202 is trained using the game imagery 208 to generate avatars that have a similar style to the video game "A," such as a similar style to characters or other elements in the video game "A," a style incorporating visual elements used in the game, or a style that is consistent with the art style of the video game "A."

In some implementations, in order to improve the ability of the image generation AI 202 to generate avatars consistent with the video game "A," the image generation AI 202 is further trained using constraint data 210. Broadly speaking, the constraint data 210 defines various constraints that are imposed on the image generation in order to produce avatars consistent with the video game "A." For example, constraint data 210 may define a maximum or minimum height or other dimension for an avatar or portion thereof, appropriate placements of elements on an avatar, acceptable colors for portions of an avatar, or other constraints defining what is acceptable or not acceptable for an avatar to be consistent with the style of the video game "A."

In some implementations, the game imagery or constraint data can include reference images or models that provide reference information for avatar generation. For example, such reference information may define typical dimensions of characters or other objects in a video game. And accordingly, when a user specifies that they wish their avatar to be tall, then the image generation AI is configured to understand that the avatar should be tall relative to the dimensions of the characters or objects in the game.

In a similar manner to training data 206 with respect to image generation AI 202 as discussed above, so the training data 212 includes game imagery 214 and constraint data 216 which are used to train the image generation AI 204 to generate avatars consistent with the style of video game "B."

Figure 3:
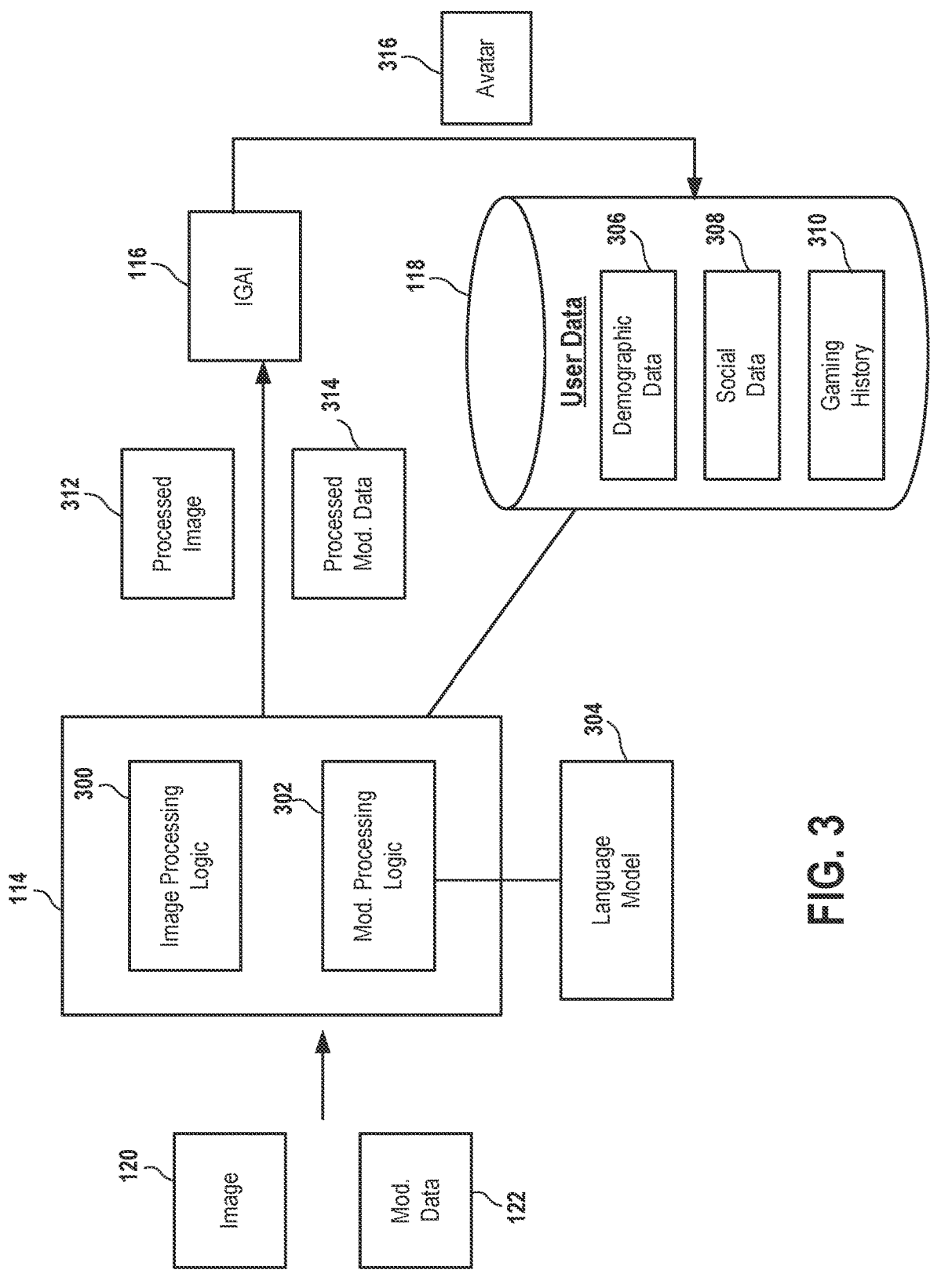
FIG. 3 conceptually illustrates processing of input for use by an image generation AI to generate an avatar, in accordance with implementations of the disclosure.

FIG. 3 conceptually illustrates processing of input for use by an image generation AI to generate an avatar, in accordance with implementations of the disclosure.

As discussed above, an image 120 of a user as well as modification data 122 provided by the user can be uploaded to an avatar generator 114 to be used to generate an avatar for the user. In some implementations, these forms of input are processed by the avatar generator 114 before being supplied to the image generation AI 116. In the illustrated implementation, the avatar generator 114 includes image processing logic 300 for processing the image 120, as well as modification processing logic 302 for processing the modification data 122.

In some implementations, the image processing logic 300 is configured to perform adjustments to the image 120 so as to improve its suitability for use to generate an avatar. Examples of such adjustments include adjustments to lighting such as adjusting exposure, brightness, contrast, shadows, highlights, adjustments to colors such as adjusting saturation, white balance, tint, adjusting sharpness, or other adjustments configured to improve the appearance of the image 120 for use by the image generation AI 116.

In some implementations, the image processing logic 300 is configured to perform adjustments that are informed by the intended target of the avatar generation process. For example, if the avatar generation process is configured to generate an avatar in a particular art style of a given video game, then the adjustments to the image 120 performed by the image processing logic 300 can be configured to reflect that particular art style. For example, if generating an avatar for a video game with muted or saturated colors, then the image processing logic 300 may be configured to desaturate or saturate (respectively) the colors of the image 120; or if generating an avatar for a video game with high or low contrast art styles, then the image processing logic 300 can be configured to increase or decrease (respectively) the contrast of the image 120; etc.

Following processing of the image 120 by the image processing logic 300, then a processed image 312 is generated and passed to the image generation AI 116 for generation of an avatar.

The modification processing logic 302 is configured to process the modification data 122 in order to better produce an avatar in accordance with a given video game and the user's preferences. It will be appreciated that following processing of the modification data 122 by the modification processing logic 302, then processed modification data 314 is generated and passed to the image generation AI 116 for generation of an avatar. In some implementations, the modification processing logic 302 accesses a language model 304 to interpret phrases or terms contained in the modification data 122. For example, the modification data 122 may include descriptive or subjective terminology that is open to interpretation, and accordingly the language model 304 can be accessed to provide a semantic understanding of the language contained in the modification data 122. In some implementations, the results of such processing by the language model 304 can be in the form of a text string which can be appended to, or possibly replace, at least some of the text of the modification data 122.

In some implementations, the modification processing logic 302 is configured to process the modification data 122 based on the target video game for which the avatar will be generated. For example, the modification processing logic 302 can be configured to append or edit text in the modification data 122 so as to include words or phrases that are designed to enable the image generation AI 116 to generate an avatar in the style of the target video game. For example, certain words may be associated with the video game and/or its characters, and at least some of these words may be added to the text of the modification data 122. In some implementations, the language model 304 is trained or otherwise tuned so as to interpret language in accordance with the context of the video game. Accordingly, there may be different language models applied for different target video games.

In some implementations, the image processing logic 300 and the modification processing logic 302 are configured to process the image 120 and the modification data 122, respectively, based on data associated to the user. Examples of such data include demographic data 306 (e.g., age, gender, geo-location, height, weight, ethnicity, language, etc.), social data 308 (e.g., data relating to the user on a social network or communications network (which may be provided by the gaming platform) such as chat history, friends, users followed, shares, likes, etc.), and gaming history data 310 (e.g. games in library, games played or portions thereof played, gameplay activity, gameplay actions, gameplay metrics, achievements, skill levels, etc). In some implementations, such data are analyzed to determine preferences or styles of the user, and these preferences or styles can be applied for processing of the image 120 and the modification data 122.

By way of example without limitation, preferred characters of the user may be determined from analyzing the user's gaming history, and the styles associated with the user's preferred characters can be determined. Such preferred character styles can then be applied by the modification processing logic 302 to influence the avatar generation, such as by including descriptive text of a preferred character style in the processed modification data 314. In some implementations, a preferred gaming style of the user can be determined by analyzing the gameplay history of the user, and the gaming style of the user can be applied by the modification processing logic 302 to influence the avatar generation, such as by including descriptive text of a preferred gaming style in the processed modification data 314. It will be appreciated that such analyses of preferred character and gaming styles can be determined for a particular video game, or across multiple video games that the user has played. In some implementations, analysis of the user's preferred character or gaming style is performed across video games of a certain genre, and such is applied for avatar generation when the target video game is of that genre.

In some implementations, certain features of an avatar can be selected by the system based on the user's data. For example, for a given video game, the system can be configured to select the user's avatar to be generated having a certain type or class of character, or having certain features, based on the user's gaming history, gaming style, skill level, etc. In some implementations, the modification processing logic 302 performs this function by appending or inserting descriptive text into the modification data to generate the processed modification data 314, the descriptive text being configured to cause the image generation AI to generate the user's avatar accordingly. By way of example without limitation, certain avatar characteristics may be associated with different skill or achievement levels within a video game, and therefore it is useful for the avatar generation process to be sensitive to the user's skill/achievement level in order to generate an avatar that is consistent therewith. In some implementations, the user may have acquired certain elements in-game, which is reflected in the user's game history (e.g. the user's inventory in the game), and accordingly, the system can be configured to generate an avatar including such elements. Again, such may be achieved by the modification processing logic 302 being configured to include descriptive text in the processed modification data 314 so as to trigger the avatar generation to include such elements. In various implementations, the modification processing logic 302 can be configured to append or include descriptive text in the processed modification data 314 that references or is based on elements in the user's gaming history, such as items in the user's inventory, skills, characters, achievements, gameplay actions, etc.

In some implementations, certain features of an avatar can be selected by the system based on the user's appearance as determined from the uploaded image 120. For example, in some implementations, the image processing logic 300 is configured to analyze the image 120 to determine features of the user's appearance in the image 120. The avatar generator 114 can be configured to select character types or features based on the determined features of the user's appearance. For example if it is determined that the user's appearance resembles a female persona, then the avatar generator 114 may select a female character type for the user's avatar to be generated. As another example, the avatar generator 114 may select a character type having a body type or shape that is similar to a body type or shape of the user as determined from the image 120. In still other examples, the avatar generator 114 may select a character type having clothing, jewelry, hair, glasses, or any other appearance features similar to that of the user. In some implementations, these selections are implemented through incorporation into the processed modification data 314 by the modification processing logic 302, such as through the inclusion of specific text identifying the selected character types or features.

Figure 4:
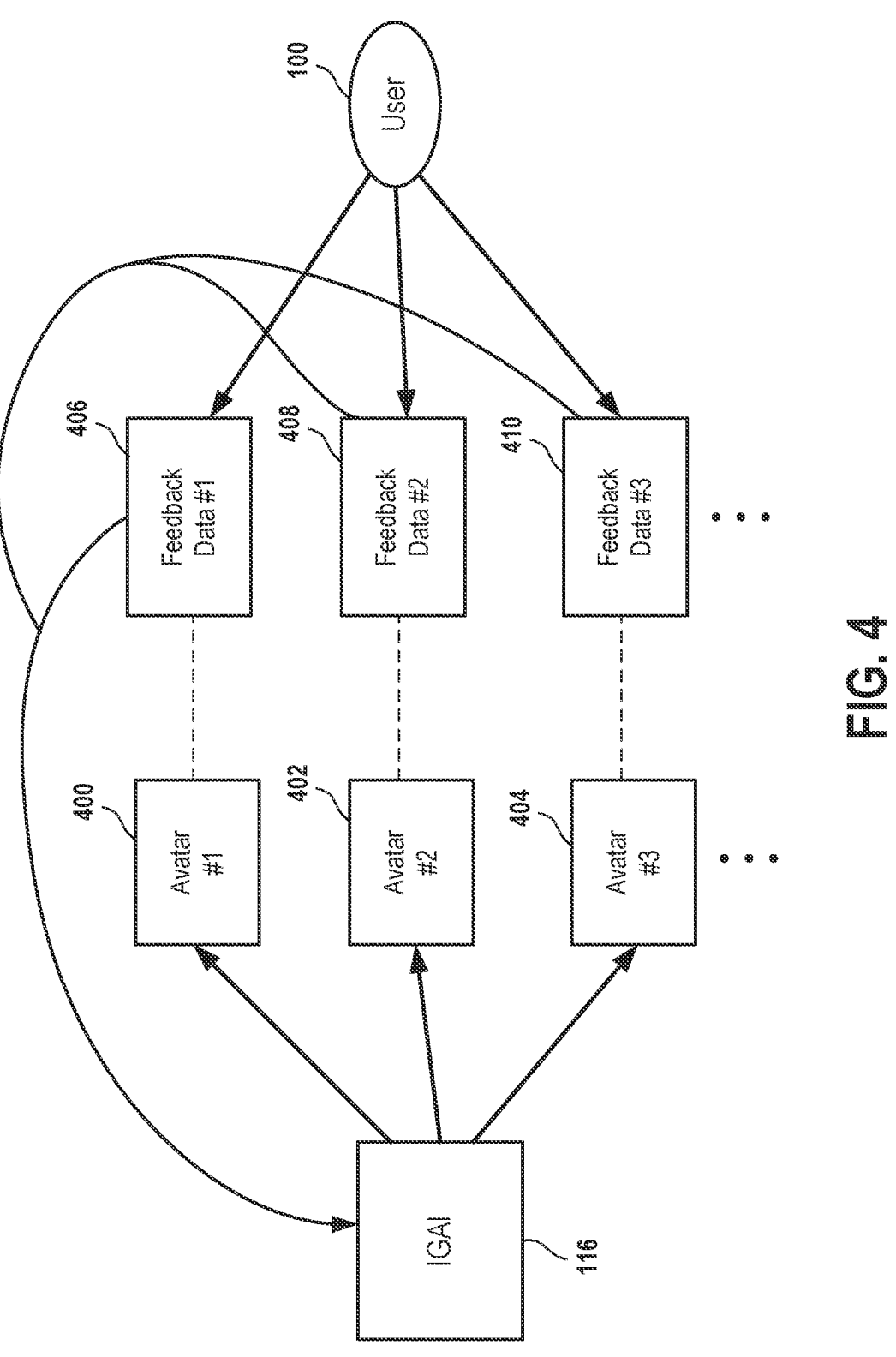
FIG. 4 conceptually illustrates an iterative process for avatar generation, in accordance with implementations of the disclosure.

FIG. 4 conceptually illustrates an iterative process for avatar generation, in accordance with implementations of the disclosure.

In the illustrated implementation, a process is shown whereby the image generation AI generates avatars that are iteratively modified in response to user feedback. Initially, the image generation AI 116 generates a first avatar 400, such as by utilizing input in the form of an image and modification data as described previously. The user 100 provides feedback regarding the first avatar 400 in the form of feedback data 406. For example, the feedback data 406 may include text or audio describing further changes that the user 100 wishes to make to the first avatar 400. The feedback data 406 along with the first avatar 400 are provided back to the image generation AI 116, which then generates a second avatar 402 that is based on the first avatar 400 and the feedback data 406. In a similar manner, the user 100 provides feedback data 408 in response to viewing the second avatar 402, and these are utilized by the image generation AI 116 to generate a third avatar 404, to which the user 100 may provide feedback data 410, and so forth. In this manner, the image generation AI 116 is used to iterate upon an avatar, making changes to the avatar in response to the user's feedback so as to iteratively generate successive iterations of the avatar that are closer to what the user 100 wants.

It will be appreciated that the feedback provided by the user 100 can be used to further train the image generation AI 116 so as to generate avatars that are more likely to be satisfactory to the user 100. For example, the user might say "make it taller," "taller still," "too tall," etc. in succession in response to multiple iterations of the avatar. And after training of the image generation AI 116 based on the user's feedback, the image generation AI 116 will be configured to better respond to the user's request to make an avatar appear "tall," as the image generation AI 116 will be tuned to the user's specific understanding of what it means to be tall.

Figure 5:
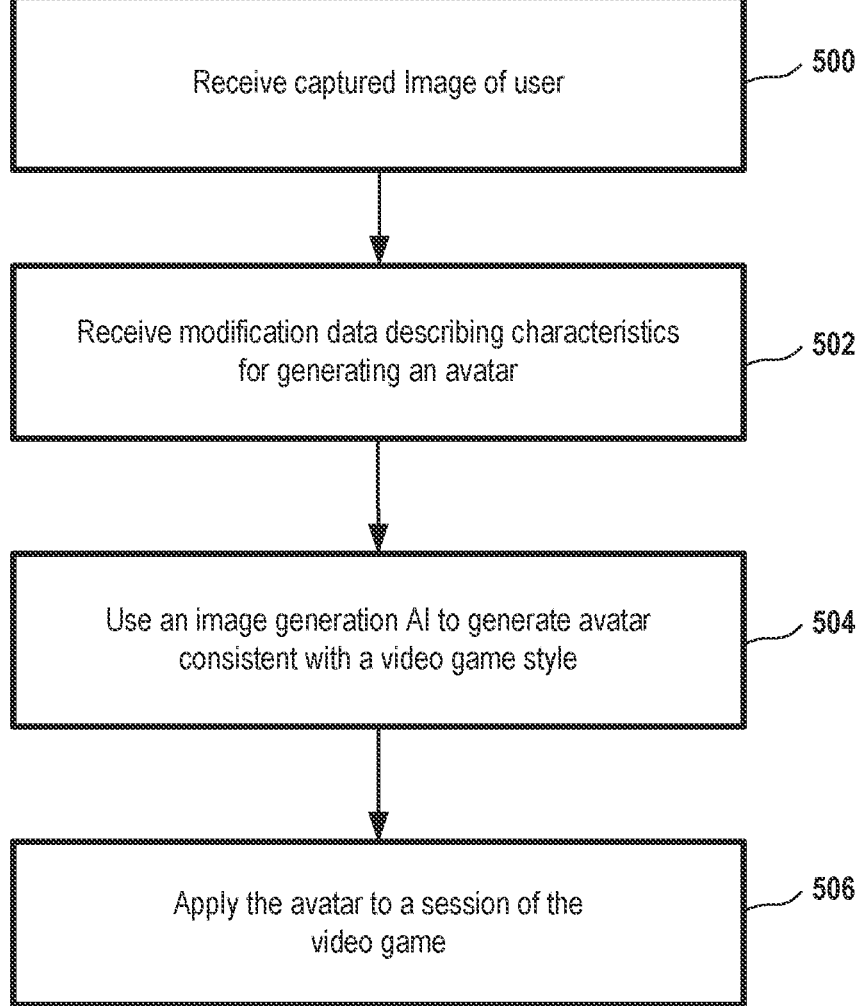
FIG. 5 conceptually illustrates a method for generating an avatar for a video game, in accordance with implementations of the disclosure.

FIG. 5 conceptually illustrates a method for generating an avatar for a video game, in accordance with implementations of the disclosure.

At method operation 500, a captured image of a user is received, for example, from a client device over a network. At method operation 502, modification data is received, the modification data describing characteristics for generating an avatar. At method operation 504, an image generation AI is used to generate an avatar consistent with a style of a video game in which the avatar will be used. At method operation 506, the avatar is applied to a session of the video game.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI could have access to a vast amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, may be more specific to a type of content, e.g., video game related art, videos and other asset related content. Even more specifically, the curated data set could include images related to specific scenes of a game or action sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to process specific types of input and render specific types of outputs. When the IGAI is customized, the machine learning and deep learning algorithms are tuned to achieve specific custom outputs, e.g., such as unique image assets to be used in gaming technology, specific game titles, and/or movies.

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 6A:
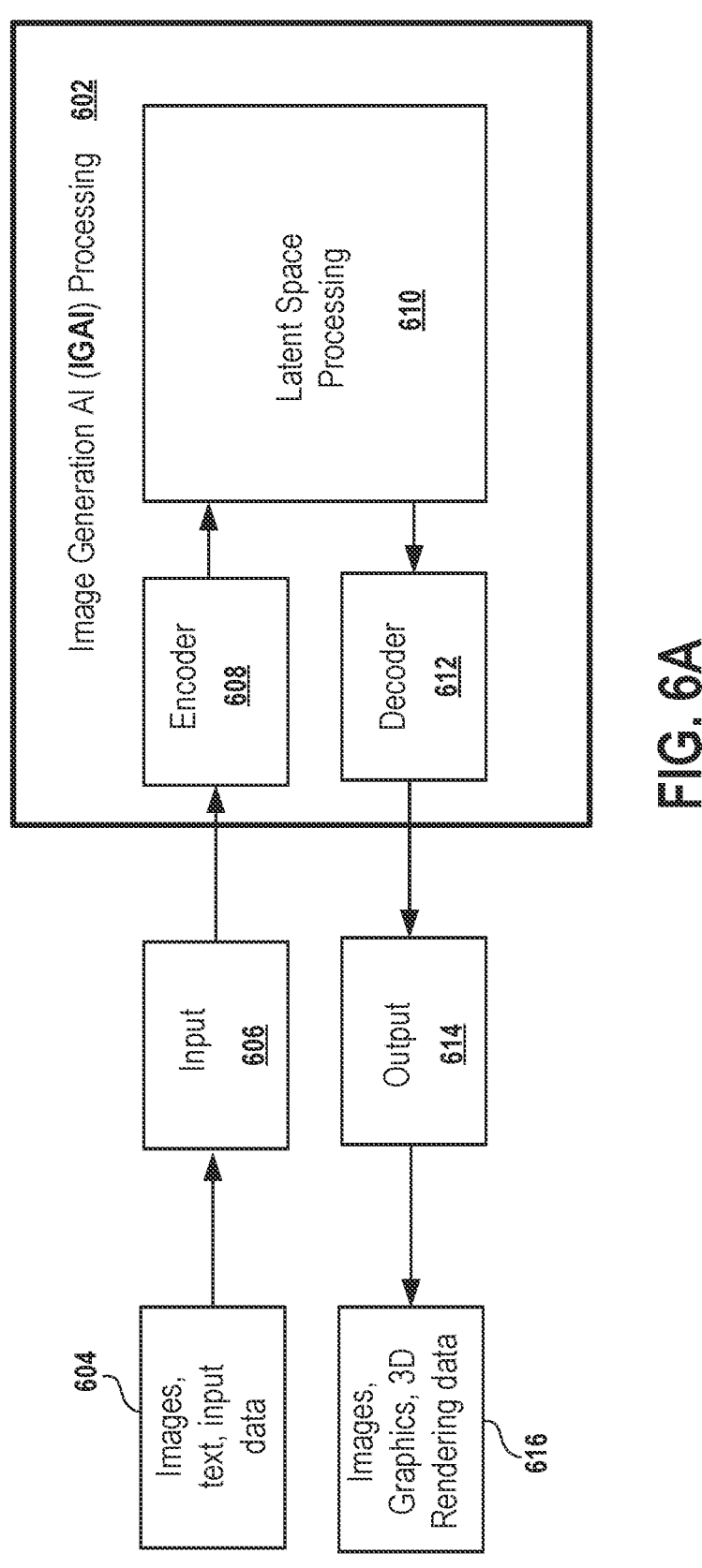
FIGS. 6A, 6B, and 6C illustrate a general representation of an image generation AI (IGAI) processing sequence, in accordance with implementations of the disclosure.

FIG. 6A is a general representation of an image generation AI (IGAI) 602 processing sequence, in accordance with one embodiment. As shown, input 606 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, icons, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 606 is configured to convey the intent of the user that wishes to utilize the IGAI to generate some digital content. In the context of game technology, the target content to be generated can be a game asset for use in a specific game scene. In such a scenario, the data set used to train the IGAI and input 606 can be used to customized the way artificial intelligence, e.g., deep neural networks, process the data to steer and tune the desired output image, data or three-dimensional digital asset.

The input 606 is then passed to the IGAI, where an encoder 608 takes input data and/or pixel space data and coverts into latent space data. The concept of "latent space" is at the core of deep learning, since feature data is reduced to simplified data representations for the purpose of finding patterns and using the patterns. The latent space processing 610 is therefore executed on compressed data, which significantly reduces the processing overhead as compared to processing learning algorithms in the pixel space, which is much more resource heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 610, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents something close to what was requested via user input. A decoder 612 then transforms a resulting output from the latent space back to the pixel space. The output 614 may then be processed to improve the resolution. The output 614 is then passed out as the result, which may be an image, graphics, 3D data, or data that can be rendered to a physical form or digital form.

Figures 6B, 6C:
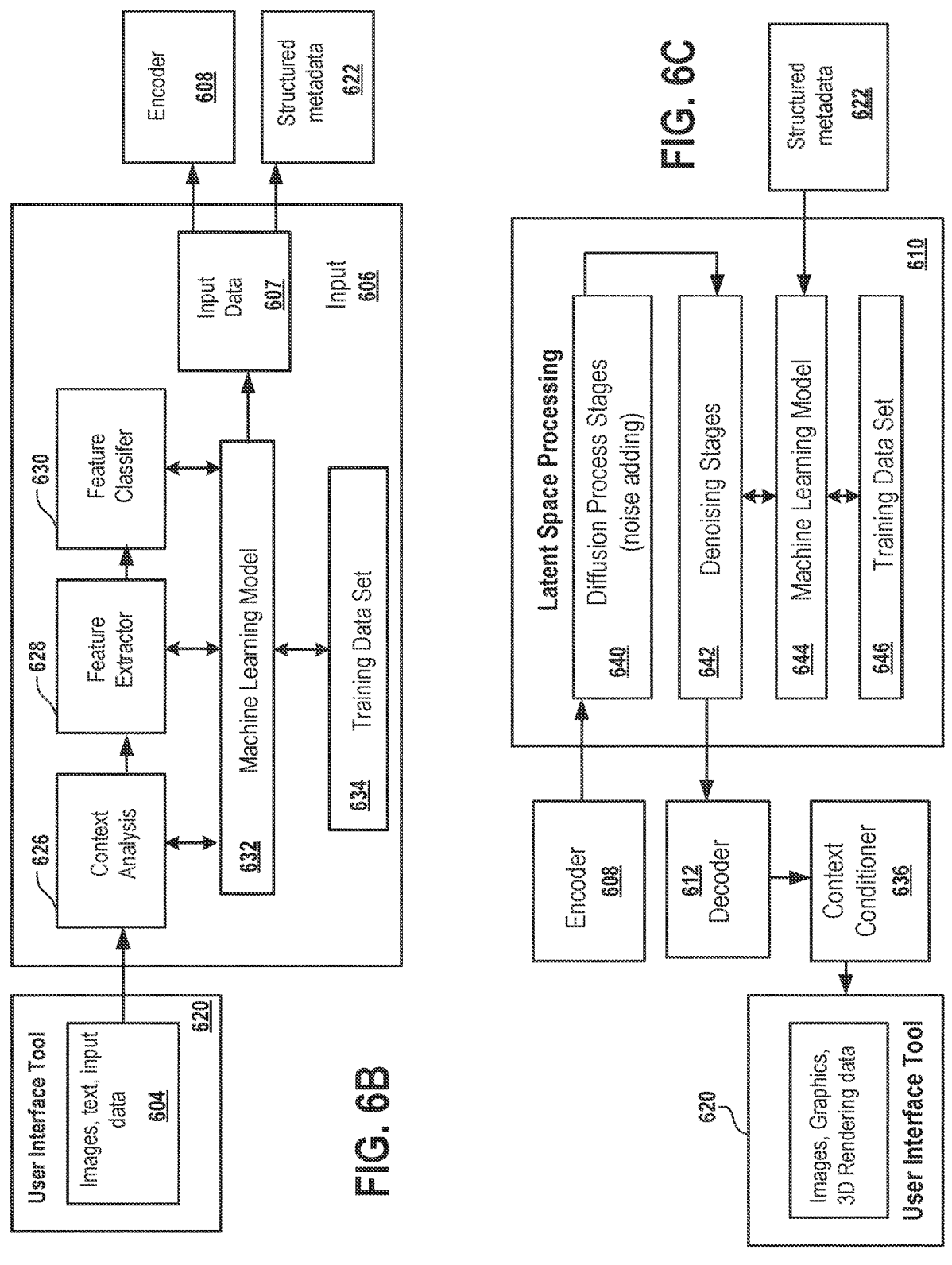

FIG. 6B illustrates, in one embodiment, additional processing that may be done to the input 606. A user interface tool 620 may be used to enable a user to provide an input request 604. The input request 604, as discussed above, may be images, text, structured text, or generally data. In one embodiment, before the input request is provided to the encoder 608, the input can be processed by a machine learning process that generates a machine learning model 632, and learns from a training data set 634. By way of example, the input data may be processed via a context analyzer 626 to understand the context of the request. For example, if the input is "space rockets for flying to mars", the input can be analyzed by the context analyzer 626 to determine that the context is related to outer space and planets. The context analysis may use machine learning model 632 and training data set 634 to find related images for this context or identify specific libraries of art, images or video. If the input request also includes an image of a rocket, the feature extractor 628 can function to automatically identify feature characteristics in the rocket image, e.g., fuel tank, length, color, position, edges, lettering, flames, etc. A feature classifier 630 can also be used to classify the features and improve the machine learning model 632. In one embodiment, the input data 607 can be generated to produce structured information that can be encoded by encoder 608 into the latent space. Additionally, it is possible to extract out structured metadata 622 from the input request. The structed metadata 622 may be, for example, descriptive text used to instruct the IGAI 602 to make a modification to a characteristic or change to the input images or changes to colors, textures, or combinations thereof. For example, the input request 604 could include an image of the rocket, and the text can say "make the rocket wider" or "add more flames" or "make it stronger" or some other modifier intended by the user (e.g., semantically provided and context analyzed). The structured metadata 622 can then be used in subsequent latent space processing to tune the output to move toward the user's intent. In one embodiment, the structured metadata may be in the form of semantic maps, text, images, or data that is engineered to represent the user's intent as to what changes or modifications should be made to an input image or content.

FIG. 6C illustrates how the output of the encoder 608 is then fed into latent space processing 610, in accordance with one embodiment. A diffusion process is executed by diffusion process stages 640, wherein the input is processed through a number of stages to add noise to the input image or images associated with the input text. This is a progressive process, where at each stage, e.g., 10-50 or more stages, noise is added. Next, a denoising process is executed through denoising stages 642. Similar to the noise stages, a reverse process is executed where noise is removed progressively at each stage, and at each stage, machine learning is used to predict what the output image or content should be, in light of the input request intent. In one embodiment, the structured metadata 622 can be used by a machine learning model 644 at each stage of denoising, to predict how the resulting denoised image should look and how it should be modified. During these predictions, the machine learning model 644 uses the training data set 646 and the structured metadata 622, to move closer and closer to an output that most resembles that requested in the input. In one embodiment, during the denoising, a U-Net architecture that has cross-attention layers may be used, to improve the predictions. After the final denoising stage, the output is provided to a decoder 612 that transforms that output to the pixel space. In one embodiment, the output is also upscaled to improve the resolution. The output of the decoder, in one embodiment, can be optionally run through a context conditioner 636. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 644 gets smarter with more training over time, there will be less need for a context conditioner 636 before the output is rendered in the user interface tool 620.

Figure 7:
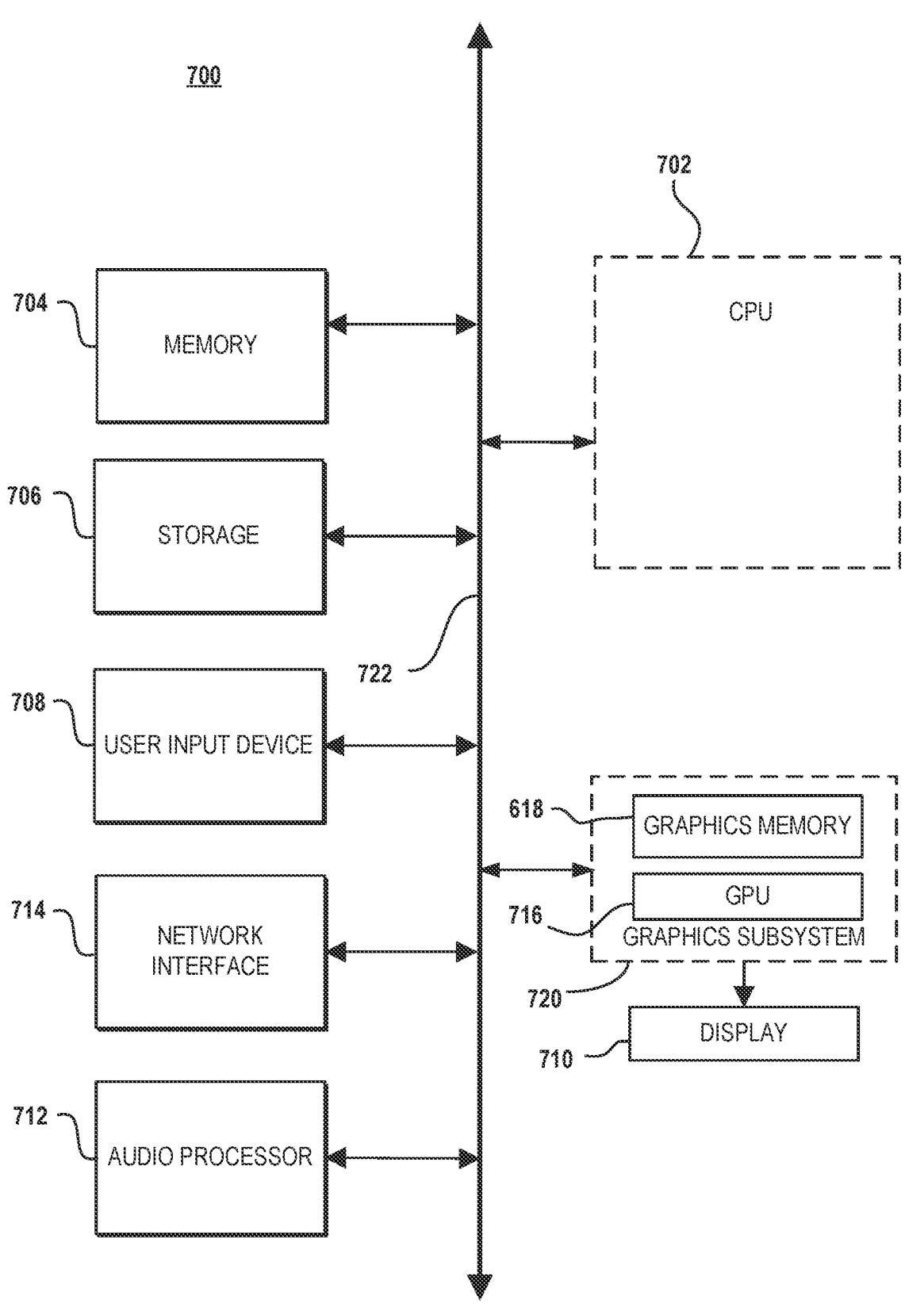
FIG. 7 illustrates components of an example device that can be used to perform aspects of the various embodiments of the present disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for generating an avatar for a video game, comprising:

receiving a captured image of a user, modification data generated from user input received at a client device, and game history data associated with the user, wherein the modification data describes characteristics for generating the avatar;

determining at least one of a preferred character, class, character feature set, or style of the user based at least in part on the game history data indicating the preferred character across one or more video game titles of a certain genre;

using an image generation artificial intelligence (AI) to generate the avatar based at least in part on the captured image of the user, the modification data, and a text description associated with the preferred character, wherein the avatar is configured for use in the video game, and wherein the image generation AI is configured to generate the avatar having a style consistent with a style of the video game in which the avatar will be used; and applying the avatar to a session of the video game.

2. The method of claim 1, wherein the modification data is defined by text data.

3. The method of claim 1, wherein the modification data identifies one or more ways in which an appearance of the user in the captured image is to be modified by the image generation AI.

4. The method of claim 1, wherein the captured image is captured by a camera connected to, or included in, the client device.

5. The method of claim 1, wherein applying the avatar to the session of the video game includes rendering the avatar in a virtual environment generated by execution of the session of the video game.

6. The method of claim 1, wherein the avatar defines a three-dimensional object in the video game.

7. The method of claim 1, wherein the modification data is processed to include one or more additional features before being used by the image generation AI to generate the avatar.

8. The method of claim 1, wherein the session of the video game is executed by the client device.

9. The method of claim 1, wherein the avatar is stored in association with a user account of the user on a gaming platform.

10. A non-transitory computer-readable medium having program instructions embodied thereon, said program instructions being configured, when executed by at least one server computer, to cause the at least one server computer to perform a method for generating an avatar for a video game, said method including the following operations:

receiving a captured image of a user, modification data generated from user input received at a client device, and game history data associated with the user, wherein the modification data describes characteristics for generating the avatar;

determining at least one of a preferred character, class, character feature set, or style of the user based at least in part on the game history data indicating the preferred character across one or more video game titles of a certain genre;

using an image generation artificial intelligence (AI) to generate the avatar based at least in part on the captured image of the user, the modification data, and a text description associated with the preferred character, wherein the avatar is configured for use in the video game, and wherein the image generation AI is configured to generate the avatar having a style consistent with a style of the video game in which the avatar will be used; and applying the avatar to a session of the video game.

11. The non-transitory computer-readable medium of claim 10, wherein the modification data is defined by text data.

12. The non-transitory computer-readable medium of claim 10, wherein the modification data identifies one or more ways in which an appearance of the user in the captured image is to be modified by the image generation AI.

13. The non-transitory computer-readable medium of claim 10, wherein the captured image is captured by a camera connected to, or included in, the client device.

14. The non-transitory computer-readable medium of claim 10, wherein applying the avatar to the session of the video game includes rendering the avatar in a virtual environment generated by execution of the session of the video game.

15. The non-transitory computer-readable medium of claim 10, wherein the avatar defines a three-dimensional object in the video game.

16. The non-transitory computer-readable medium of claim 10, wherein the modification data is processed to include one or more additional features before being used by the image generation AI to generate the avatar.

17. The non-transitory computer-readable medium of claim 10, wherein the session of the video game is executed by the client device.

18. The non-transitory computer-readable medium of claim 10, wherein the avatar is stored in association with a user account of the user on a gaming platform.

* * * * *